United States Patent [19]

Kobayashi et al.

[11] Patent Number: 4,725,955
[45] Date of Patent: Feb. 16, 1988

[54] APPARATUS FOR CONTROLLING IGNITION TIMING IN AN INTERNAL COMBUSTION ENGINE

[75] Inventors: Nobuyuki Kobayashi; Takashi Hattori; Toshimitsu Ito, all of Toyota, Japan

[73] Assignee: Toyota Jidosha Kabushiki Kaisha, Toyota, Japan

[21] Appl. No.: 730,582

[22] Filed: May 6, 1985

[30] Foreign Application Priority Data

May 7, 1984 [JP] Japan .................................. 59-91595

[51] Int. Cl.⁴ ............................................ F02M 51/00
[52] U.S. Cl. .......................... 364/431.05; 364/431.08; 123/417
[58] Field of Search ...................... 364/431.08, 431.05, 364/431.03; 123/417, 486, 339, 425, 435

[56] References Cited

U.S. PATENT DOCUMENTS

| | | |
|---|---|---|
| 4,099,495 | 7/1978 | Kiencke et al. . |
| 4,282,573 | 8/1981 | Imai et al. . |
| 4,328,779 | 5/1982 | Hattori et al. . |
| 4,376,428 | 3/1983 | Hata et al. ............................ 123/417 |
| 4,403,584 | 9/1983 | Suzuki et al. ................... 364/431.05 |
| 4,424,568 | 1/1984 | Nishimura et al. . |
| 4,450,528 | 5/1984 | Yaegashi et al. . |
| 4,466,405 | 8/1984 | Hattori et al. . |
| 4,480,606 | 11/1984 | Kato et al. . |
| 4,502,442 | 3/1985 | Takakuwa et al. ................. 123/417 |
| 4,506,639 | 3/1985 | Minakami et al. .................. 123/339 |
| 4,508,079 | 4/1985 | Komurasaki et al. .............. 123/425 |
| 4,558,417 | 12/1985 | Akiyama et al. .................... 123/417 |
| 4,561,056 | 12/1985 | Hirayama et al. . |
| 4,562,545 | 12/1985 | Hasegawa . |
| 4,566,068 | 1/1986 | Iwasaki et al. ...................... 123/486 |
| 4,590,565 | 5/1986 | Takasu et al. .................. 364/431.08 |

FOREIGN PATENT DOCUMENTS 58-143108 8/1983 Japan .

*Primary Examiner*—Parshotam S. Lall
*Attorney, Agent, or Firm*—Cushman, Darby & Cushman

[57] ABSTRACT

Disclosed is an engine having an air-fuel ratio control apparatus for obtaining various air-fuel ratios, the range of which is between the stoichiometric air-fuel ratio or lower than that ratio and the high air-fuel ratio providing a very lean air-fuel mixture. A plurality of ignition timing maps is provided, these maps having a respective order of priority determined by the air-fuel ratio. During operation of the engine, parameters substantially related to the air-fuel ratio ranges are detected, and a map having the highest order of priority is selected from the maps which meet the engine parameters. The ignition timing is calculated from the selected map.

1 Claim, 35 Drawing Figures

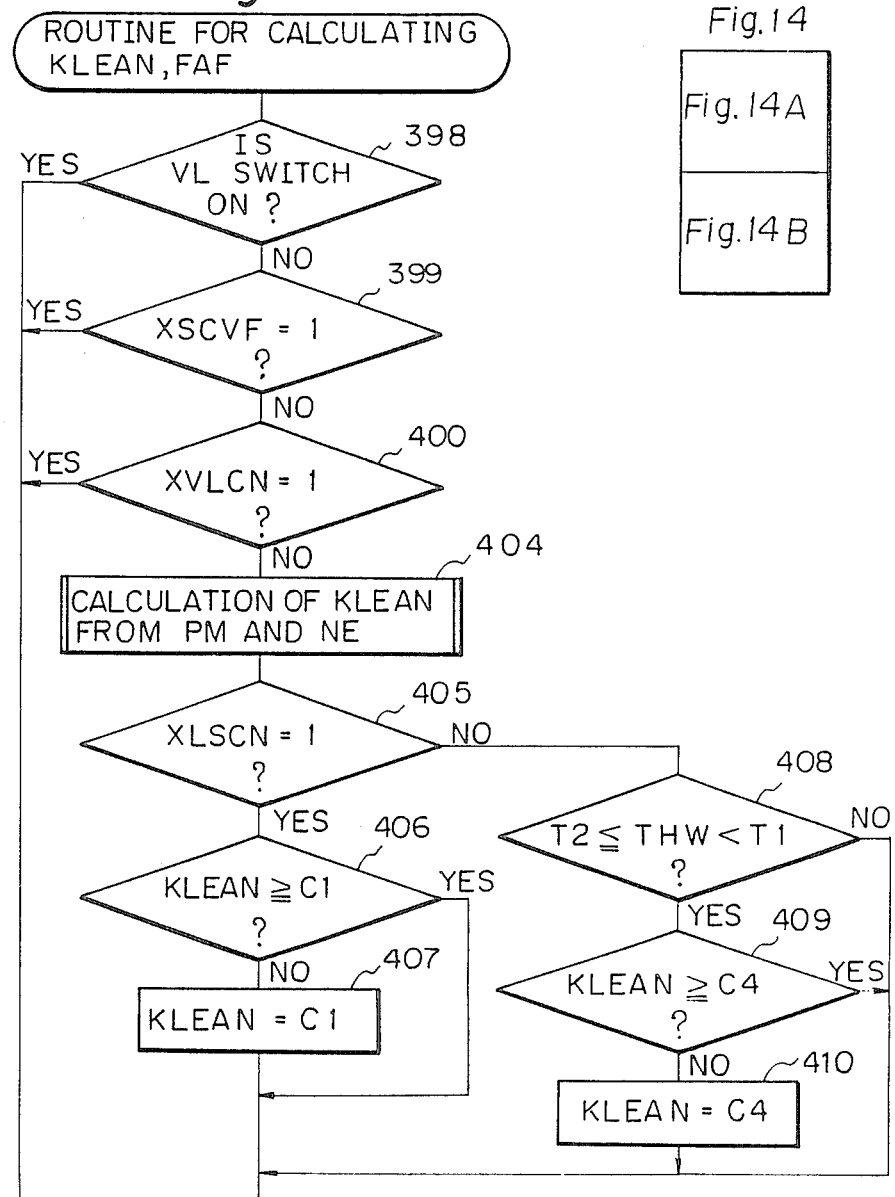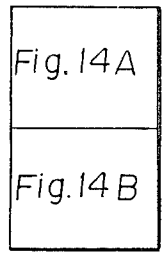

Fig. 21

| ADDRESS | |
|---|---|
| $A_1$ <br> ┆ <br> $A_2$ | $\theta$ (BASE) |
| $A_3$ <br> ┆ <br> $A_4$ | $\theta$ (OPN) |
| $A_5$ <br> ┆ <br> $A_6$ | $\theta$ (LS) |
| $A_7$ <br> ┆ <br> $A_8$ | $\theta$ (WP) |
| $A_9$ <br> ┆ <br> $A_{10}$ | $\theta$ (VL2) |
| $A_{11}$ <br> ┆ <br> $A_{12}$ | $\theta$ (VL1) |

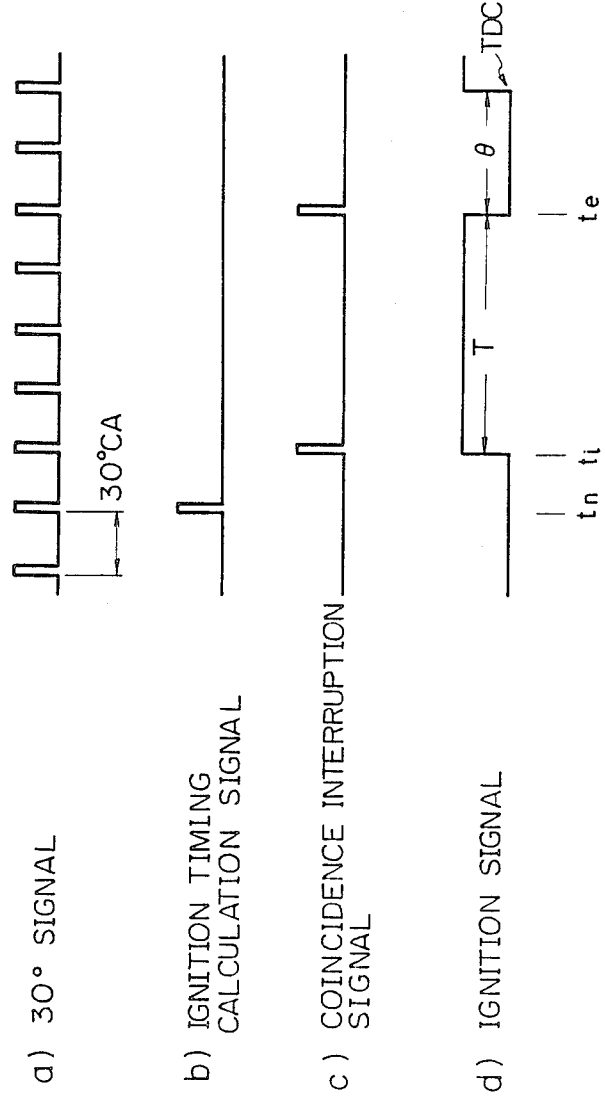

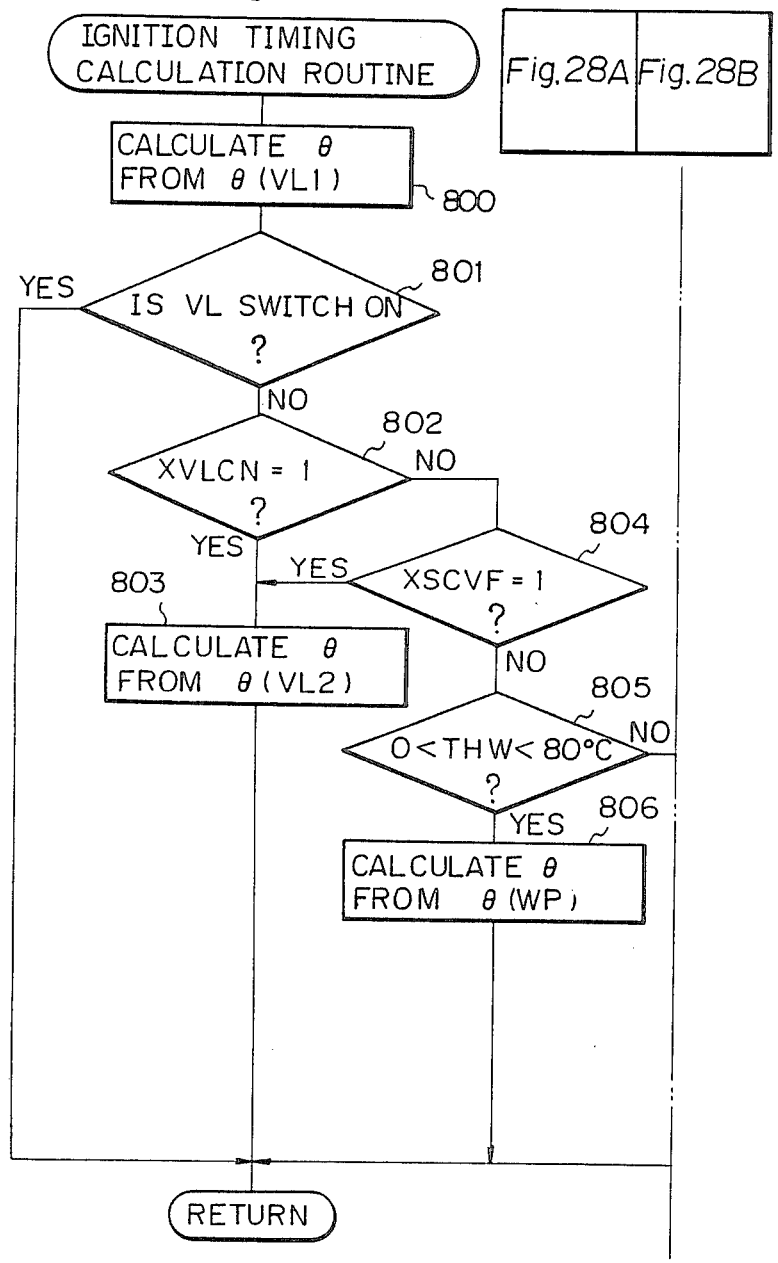

APPARATUS FOR CONTROLLING IGNITION TIMING IN AN INTERNAL COMBUSTION ENGINE

BACKGROUND OF THE INVENTION

1. Field of the Invention

The present invention relates to an ignition control apparatus for an internal combustion engine. More particularly, it relates to an ignition control apparatus provided with a plurality of ignition timing data maps which are selected in accordance with changes in the operating condition of the engine.

2. Description of the Related Art

An internal combustion engine as applied to an automobile and provided with an electric control system, such as a micro-computer system adapted for effective control of the engine, is well known in the art.

Such a system is used to control various operating parameters of the internal combustion engine, for example, ignition timing in a spark ignition type engine, in which the control apparatus controls the optimum value of the ignition timing in accordance with engine operating parameters, such as engine speed and engine load.

Known in the prior art is an electric control system for an internal combustion engine wherein the air-fuel ratio of the air-fuel mixture to be introduced into the engine combustion chambers is controlled to a theoretical value. This system utilizes ignition timing data maps, and an ignition timing is calculated by a map in accordance with the engine load and the engine speed.

Recently, due to improvements made to sensor devices and control devices, a system has been proposed wherein the air-fuel mixture is controlled in the area leaner than that providing the theoretical air-fuel ratio, to save fuel consumption. Such a control of the air-fuel mixture is referred to hereinafter as "lean A/F control". In such lean A/F control, the combustion is controlled in the lean area under a stable running condition of the engine. When the engine is required to provide a high output, the combustion is also controlled in an area corresponding to the theoretical air-fuel ratio and sometimes in the area which is richer than the area corresponding to the theoretical air-fuel ratio. In this system, the air-fuel ratio is therefore widely varied in accordance with the conditions of the engine, which makes it difficult to obtain an optimum ignition timing calculated by a single map. The ignition timing calculated by a single map can, of course, be arithmetically corrected in accordance with the operating condition of the engine. The correction is, however, insufficient to attain optimum control of the ignition timing in every area of the engine, and thus a deterioration occurs in the drivability, knocking is caused, and the fuel consumption efficiency becomes degraded.

This difficulty is worsened if the engine is provided with a swirl control system for attaining a stable combustion with lean A/F control, since selection of the ignition timing in this case becomes very complex.

This difficulty is more or less encountered also when the air-fuel ratio is controlled to the stoichiometric value.

SUMMARY OF THE INVENTION

An object of the present invention is to provide an apparatus for controlling the ignition timing in such a manner that it is suitably carried out in accordance with any change in the engine operating conditions.

According to the present invention, an apparatus is provided for controlling an ignition timing in a spark ignition internal combustion engine, which apparatus comprises: means for storing a plurality of ignition timing data maps, these maps having a respective order of priority which is determined in accordance with engine requirements related to the ignition timing; means for detecting a plurality of engine parameters related to at least one engine operating condition; means for judging whether the parameters detected by the detecting means meet the engine requirement; means for selecting a map which has the highest order of priority from the maps judged by the judging means so that the detected parameters are matched to the engine requirement; means for calculating an ignition timing from the map selected by the selecting means; and means for controlling the ignition in such a manner that ignition occurs at the calculated ignition timing.

BRIEF DESCRIPTION OF THE DRAWINGS

The present invention may be more fully understood from the description of the preferred embodiment of the invention set forth below, together with the accompanying drawings, in which:

FIGS. 13, 14, 14A, 14B and 15 show flow charts for explaining the controlling of the air-fuel ratio;

FIG. 21 shows an arrangement of the various maps in the ROM addresses;

FIGS. 27a-27d show timing charts of the ignition timing control operation; and

FIG. 28, 28A and 28B show a flow chart for explaining the calculating of the ignition timing from the selected map in the second embodiment.

DESCRIPTION OF THE PREFERRED EMBODIMENTS

Figure 1:
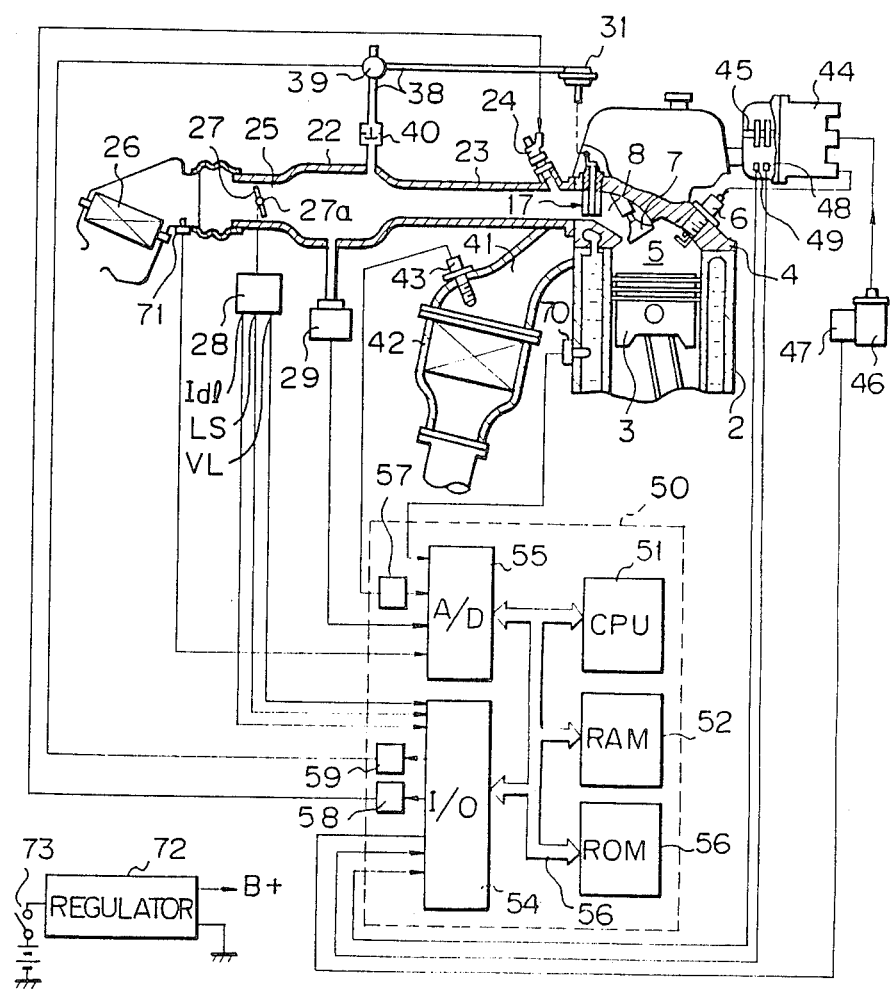
FIG. 1 is a cross-sectional view of an entire engine, with a block diagram of a control circuit.
Figure 2:
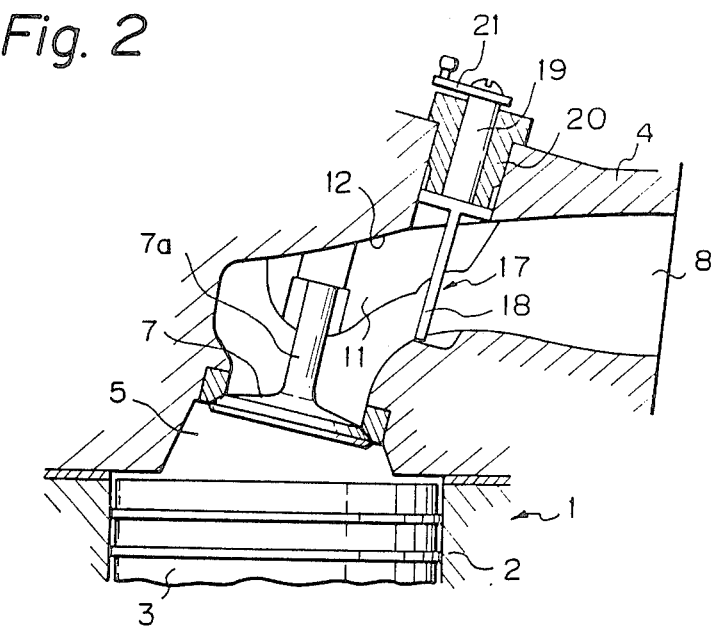
FIG. 2 is a cross-sectional side view of the cylinder head.
Figure 3:
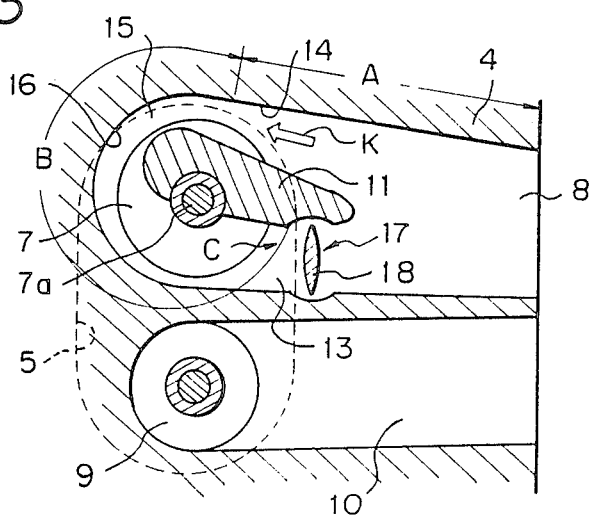
FIG. 3 is a cross-sectional plan view of the cylinder head.
Figure 4:
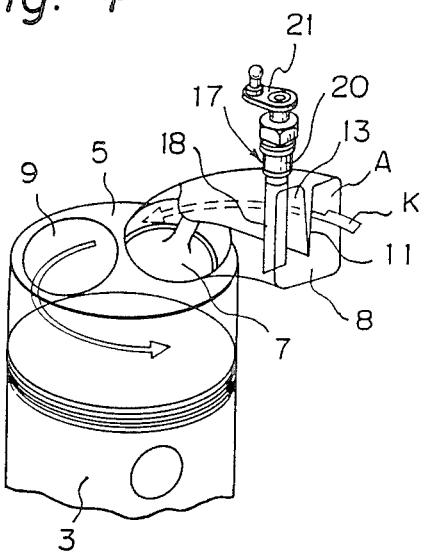
FIG. 4 is a schematically illustrated perspective view of the engine.

Referring to FIGS. 1 through 4, reference numeral 1 designates an engine body, 2 a cylinder block, 3 a piston reciprocally movable in the cylinder block 2, and 4 a cylinder head fixed to the cylinder block 2; 5 designates a combustion chamber, 6 a spark plug arranged in the combustion chamber 5, 7 an intake valve, and 8 a helically-shaped intake port; 9 designates an exhaust valve, and 10 an exhaust port. A downwardly projecting separating wall 11 is formed on the upper wall 12 of the intake port 8, and a space is formed between the lower face of the separating wall 11 and the bottom wall of the intake port 8. This separating wall 11 passes the side of the valve stem 7a and extends along the axis of the intake port 8. An inlet passage portion A, a helical portion B, and a bypass passage 13 are formed in the intake port 8 by the separating wall 11. The inlet passage portion A is tangentially connected to the helical portion B, and the bypass passage 13 is branched from the inlet passage portion A and connected to the helix terminating portion C of the helical portion B. As illustrated in FIG. 3, the transverse width of the inlet passage portion A formed between the side wall 14 of the intake port 8 and the separating wall 11 decreases toward the helical portion B, and a narrow passage portion 15 is formed between the cylindrical side wall 16 of the helical portion B and the separating wall 11. A swirl control valve 17 is arranged in the bypass passage 13. This swirl control valve 17 includes a thin walled valve body 18 and a valve shaft 19, the valve shaft 19 being rotatably supported by a valve holder 20 fixed to the cylinder head 4. As illustrated in FIG. 2, an arm 21 is fixed to the upper end of the valve shaft 19.

Figure 6:
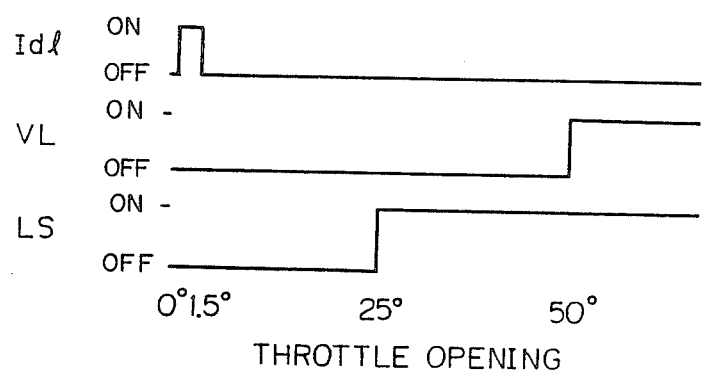
FIG. 6 is a diagram illustrating the operation of the idle switch Idle, lean switch LS, and fully open switch VL of the throttle sensor.

As illustrated in FIG. 1, the intake port 8 is connected to a surge tank 22 via a branch pipe 23, and a fuel injector 24 is arranged in the branch pipe 23. This fuel injector 24 is connected to the fuel pump (not shown) driven by the engine. The surge tank 22 is connected to the outside air via an intake air duct 25 and an air filter element 26, and a throttle valve 27 actuated in response to the depression of the accelerator pedal (not shown) is arranged in the intake air duct 26. A throttle sensor 28 is connected to the valve shaft 27a of the throttle valve 27. The throttle sensor 28 is provided with an idle switch Idle, lean switch LS, and fully open switch VL, as shown in FIG. 6. The idle switch Idle is made ON when the degree of opening of the throttle valve 27 is lower than a predetermined degree, for example, 1.5 degrees. The lean switch LS is made ON when the degree of opening of the throttle valve 27 exceeds a predetermined degree, for example, 25 degrees. The fully open switch VL is made ON when the degree of opening of the throttle valve 27 exceeds a further predetermined degree, for example, 50 degrees. These switches Idle, LS, and VL are connected to a control unit 50.

A vacuum sensor 29 is attached to the surge tank 22 and produces an output voltage proportional to the absolute pressure produced in the surge tank 22. This vacuum sensor 29 is connected to the electronic control unit 50.

Figure 5:
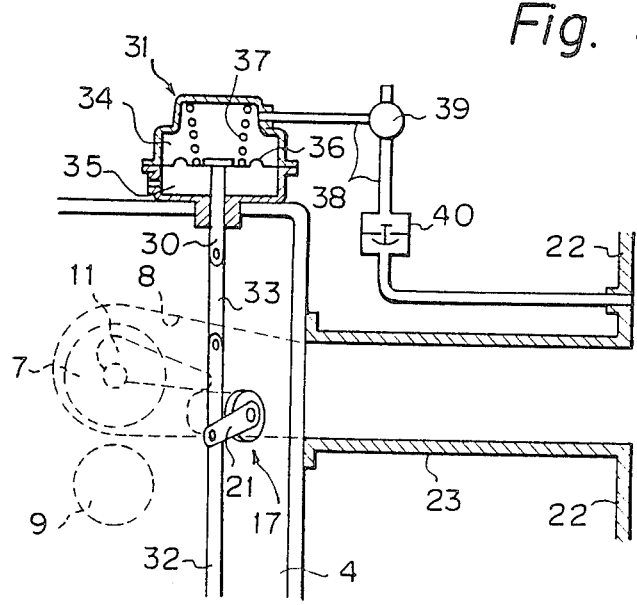
FIG. 5 is a plan view, partly in cross-section, of a portion of the cylinder head.

As illustrated in FIGS. 1 and 5, the arm 21 of the swirl control valve 17 is connected to a control rod 30 of an actuator 31 via a connecting rod 32 and a link member 33. The actuator 31 includes a vacuum chamber 34 and an atmospheric pressure chamber 35, which chambers are separated by a diaphragm 36. The control rod 30 is connected to the diaphragm 36, and a compression spring 37 for biasing the diaphragm is arranged in the vacuum chamber 34. The vacuum chamber 34 is connected to the surge tank 22 via a conduit 38. A solenoid valve 39, which can be opened to the outside air, is arranged in the conduit 38 and, in addition, a check valve 40 which permits only the outflow of air from the vacuum chamber 34 to the surge tank 22 is arranged in the conduit 22. The solenoid valve 39 is connected to the electronic control unit 50 and is controlled in response to signals output by the electronic control unit 50.

When the vacuum chamber 34 of the actuator 31 is connected to the surge tank 22 via the solenoid valve 39, vacuum acts in the vacuum chamber 34. At this time, the check valve 40 opens only when the level of vacuum in the surge tank 22 is higher than that of the vacuum in the vacuum chamber 34. Consequently, the level of vacuum in the vacuum chamber 34 is maintained at the maximum vacuum produced in the surge tank 22. When the level of vacuum in the vacuum chamber 34 exceeds a predetermined level, the diaphragm 36 moves toward the vacuum chamber 34 and, as a result, the swirl control valve 17 closes the bypass passage 13, as illustrated in FIG. 3. At this time, air introduced into the inlet passage portion A of the intake port 8 flows into the helical portion B, as illustrated by the arrow K in FIGS. 3 and 4. Then, since the inlet passage portion A is formed in such a manner that the transverse width thereof decreases toward the helical portion B, as mentioned above, the velocity of the air is increased. The air then flows along the cylindrical side wall 16 of the helical portion B, and thus a strong swirl motion is created.

When the vacuum chamber 34 of the actuator 31 is opened to the outside air via the solenoid valve 39, the diaphragm 36 is moved toward the atmospheric pressure chamber 35 by the spring force of the compression spring 37. As a result, the swirl control valve 17 opens the bypass passage 13. Consequently, at this time, part of the air flows into the helical portion B via the bypass passage 13 having a small flow resistance. This part of the air comes into head-on collision with the air stream swirling along the cylindrical side wall 16 of the helical portion B, and thus the swirl motion is weakened. As mentioned above, when the swirl control valve 17 is open to the maximum extent, the swirl motion is weakened and, in addition, the flow area of the intake port 8 is increased. As a result, a high volumetric efficiency can be obtained.

Figure 7:
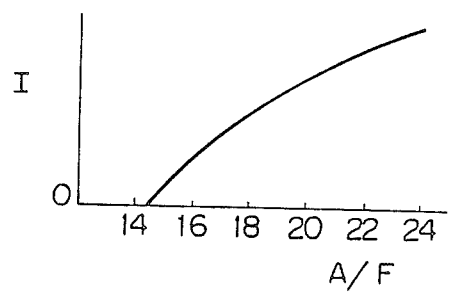
FIG. 7 shows a relationship between the air-fuel ratio and the output current of the lean sensor.

Referring to FIG. 1, an exhaust manifold 41 is connected to the exhaust port 10 (FIG. 3), and a catalytic converter 42 containing a catalyzer therein is connected to the exhaust manifold 41. Hydrocarbons (HC), carbon-monoxide (CO), and nitrogen-oxides (NOx) are purified in the catalytic converter 42. A lean sensor 43 is arranged in the exhaust manifold 41 and connected to the electronic control unit 50. The lean sensor 43 produces an output current proportional to the oxygen concentration in the exhaust gas, as illustrated in FIG. 7. In FIG. 7, the ordinate indicates the output current I of the lean sensor 43, and the abscissa indicates the air-fuel ratio (A/F). The construction and the operation of the lean sensor 43 is known (for example, Japanese Unexamined Patent Publication (Kokai) No. 58-143108) and, therefore, a description of the construction and the operation of the lean sensor 43 is omitted.

As illustrated in FIG. 1, the engine 1 is equipped with a distributor 44 having a rotor 45 driven by the engine 1. The distributor 44 is connected to the electronic control unit 50 via an ignition coil 46 and an igniter 47. The electronic control unit 50 produces an ignition signal (FIG. 27(d)). This ignition signal is fed into the igniter 47 and the primary current of the ignition coil 46 is then controlled by the ignition signal. The high voltage produced in the ignition coil 46 is applied to the spark plug 6 of each cylinder via the distributor 44, and thus the spark plug 6 produces a spark at a time determined by the ignition signal. A pair of crank angle sensors 48, 49 are arranged in the distributor 44 and connected to the electronic control unit 50. The crank angle sensor 48 produces an output pulse every time the crank shaft of the engine 1 rotates by 30 degrees, and the crank angle sensor 49 produces an output pulse every time the crankshaft of the engine 1 rotates by 720 degrees.

An engine cooling water temperature sensor 70 is mounted to the cylinder block 2 and produces an output voltage proportional to the temperature of the cooling water in a water jacket in the engine. The temperature sensor 70 is connected to the control unit 50.

An outside air temperature sensor 71 is arranged in the intake system near the air cleaner 26, for producing an output voltage proportional to the temperature of the air. The sensor 71 is connected to the control unit 50.

The electronic control unit 50, to which power is supplied by a regulator 72 operated by engine key switch 73, is constructed as a digital computer and includes a central processing unit (CPU) 51 carrying out the arithmetic and logic processing, a random-access memory (RAM) 52, a read-only memory (ROM) 53 storing a predetermined control program and arithmetic constant therein, an input/output (I/O) port 54, and an analog-digital (A/D) converter 55 incorporating a multiplexer. The CPU 51, the RAM 52, the ROM 53, the I/O port 54, and the A/D converter 55 are interconnected to each other via a bidirectional bus 56. The idle switch Idle, lean switch VL, and fully open switch VL of the throttle sensor 28 are connected to the I/O port 54, and signals output by the throttle sensor 28 are input to the I/O port 54. The vacuum sensor 29 is connected to the A/D converter 55, and the output signal of the vacuum sensor 29 is input to the A/D converter 55. The lean sensor 43 is connected to the A/D converter 55 via a current-voltage converting circuit 57 of the electronic control unit 50. The output current of the lean sensor 43 is converted to corresponding voltage in the current-voltage converting circuit 57, and the voltage thus converted is then input to the A/D converter 55. The water temperature sensor 70 is connected to the A/D converter 55 and the signal output from the temperature sensor 70 is input to the A/D converter 55. The air temperature sensor 71 is connected to the A/D converter 55, and the signal output from the sensor 71 is input to the A/D converter 55. In the A/D converter 55, the output voltage of the vacuum sensor 29, the output voltage of the current-voltage converting circuit 57, the output voltage of the water temperature sensor 70, or the output voltage of the air temperature sensor 71 is selectively converted to a corresponding binary code in response to the indication signal issued form the CPU 51. The binary code thus obtained, that is, data representing the absolute pressure PM in the surge tank 22, data corresponding the output current LNSR of the lean sensor 42, data indicating the water temperature THW, and data indicating the air temperature TA are stored in the RAM 52.

The crank angle sensors 48 and 49 are connected to the I/O port 54, and the output pulses of the crank angle sensors 48 and 49 are input to the I/O port 54. These output pulses are then input to the CPU 51 and, for example, the engine speed NE is calculated by measuring the number of output pulses which the crank angle sensor 48 produces per unit time. The thus-calculated engine speed NE is stored in the RAM 52.

The fuel injector 24 and the solenoid valve 39 are connected to the I/O port 54 via corresponding drive circuits 58 and 59, and the igniter 47 is connected to the I/O port 54. An injection signal is fed into the fuel injector 24 from the CPU 51 via the I/O port 54 and the drive circuit 58. The solenoid of the fuel injector 24 is energized for a time period determined by the injection signal, and thus fuel is intermittently injected from the fuel injector 24 into the intake port 8. A swirl control drive signal is fed into the solenoid valve 39 from the CPU 51 via the I/O port 54 and the drive circuit 59. The solenoid valve 39 is energized for a time period determined by the swirl control drive signal. As mentioned previously, the ignition signal is fed into the ignitor 47 from the CPU 51 via the I/O port 54.

In the engine according to the present invention, various kinds of air-fuel mixture are supplied to the engine in accordance with the engine requirements. Roughly speaking, when the engine is operating at a high load, the air-fuel mixture of an approximately stoichiometric air-fuel ratio or smaller is fed into the engine cylinders. When the engine is operating at a low load, the lean air-fuel mixture is fed into the engine cylinders, although the air-fuel ratio is determined by the position of the throttle valve 27. That is, when the throttle opening is large, a relatively lean air-fuel mixture (air-fuel ratio is, for example, 18:1–19:1) is fed into the cylinders. Contrary to this, when the throttle opening is small, an extremely lean air-fuel mixture (air-fuel ratio is, for example, 22:1) is fed into the cylinders. In addition, when the air-fuel mixture of an approximately stoichiometric air-fuel ratio is fed into the cylinders, the swirl control valve 17 is opened to the maximum extent and, when the lean air-fuel mixture is fed into the cylinders, the swirl control valve 17 is closed. If the swirl control valve 17 is closed, a strong swirl motion is created in the combustion chamber 5 and, as a result, the burning velocity is increased. Consequently, at this time, even if the lean air-fuel mixture is fed into the cylinders, stable combustion can be obtained. The above-mentioned operation is a basic operation.

In addition to the basic operation of the control of the air-fuel ratio, the lean air-fuel mixture is corrected in accordance with various operating conditions. For example, when the engine is cold, the lean air-fuel mixture is corrected so that its highest value is lower than that of the very lean air-fuel mixture. This means that the very lean air-fuel mixture is usually supplied to the engine without correction after the engine has warmed-up.

However, when the feedback control of the air-fuel ratio is stopped due to a particular engine operating condition, the very lean air-fuel mixture is also corrected so that its highest air-fuel ratio is lower than that of the extremely lean air-fuel mixture.

Figure 8:
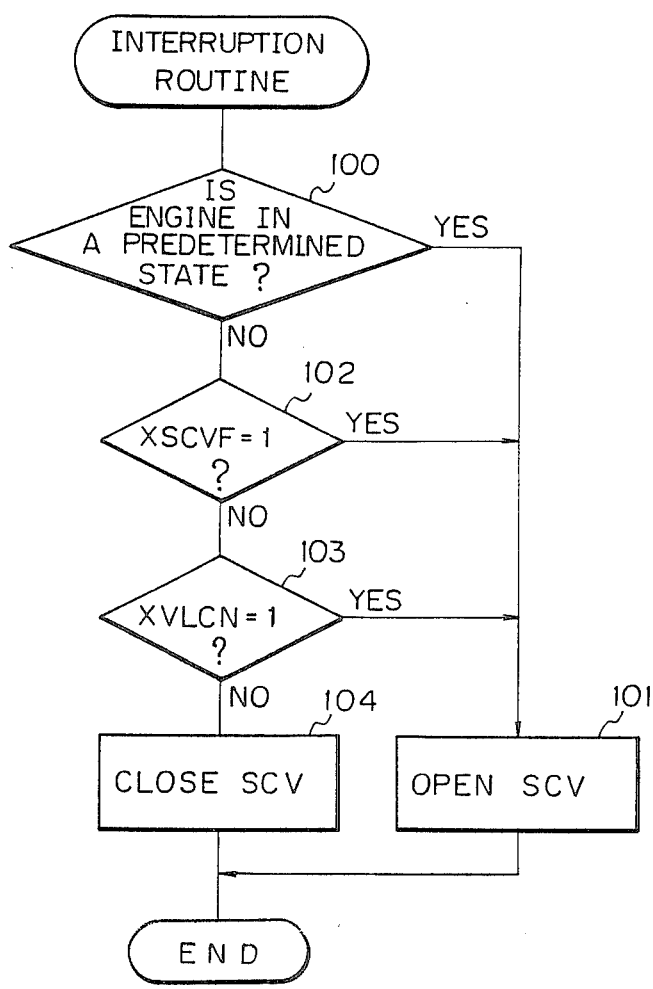
FIG. 8 is a flow chart showing the operation of the swirl control valve (SCV)

FIG. 8 illustrates the processing routine for controlling the swirl control valve 17. This routine is processed by sequential interruptions executed at predetermined time intervals. Referring to FIG. 8, initially, at step 100, it is judged whether the engine is in one of the predetermined states in which the swirl control valve 17 should be opened. These predetermined states are as follows.

(1) when the engine speed is higher than 2800 rpm
(2) when the throttle valve 27 is open to the maximum extent
(3) when the starting operation of the engine is carried out When at least one of the above states (1), (2), and (3) is satisfied, the routine goes to step 101. At step 101, the solenoid valve 39 is energized, and the vacuum chamber 34 of the actuator 31 opened to the outside air. As a result, the swirl control valve (SCV) 17 is opened to the maximum extent. When the engine is not in a predetermined state in which the swirl control valve 17 should be opened, the routine goes to step 102 where it is judged whether a flag XSCVF is 1. At a following point 103 it is judged whether a flag XVLCN is 1. When the flag XSCVF or XVLCN is 1, the routine goes to the above-mentioned step 101 to open the SCV 17. The meaning of the flags will be described later. When both the flags are 0, then the routine goes to step 104 and the solenoid valve 39 is de-energized. As a result, the vacuum chamber 34 of the actuator 31 is connected to the surge tank 22 and the swirl control valve (SCV) 17 is closed.

Figure 9:
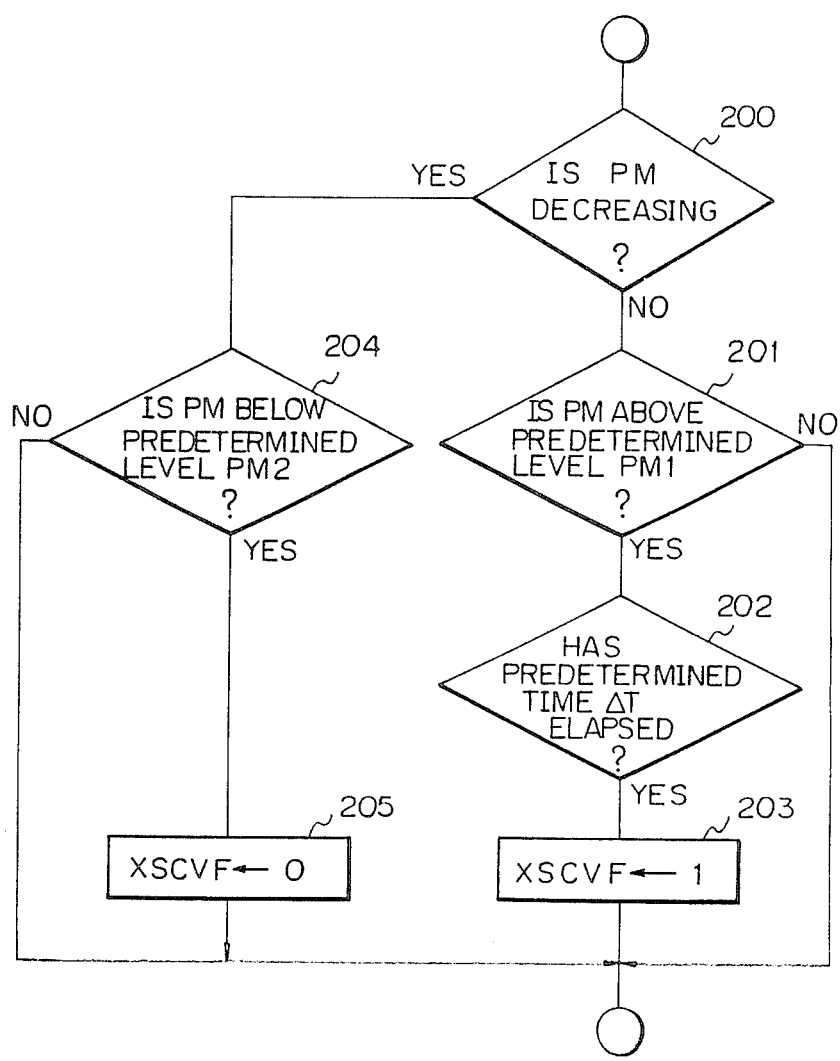
FIGS. 9 to 12 respectively show a routine for controlling flags used in the routines for controlling the air-fuel ratio and ignition timing.

FIG. 9 illustrates the processing routine for setting the flag XSCVF. At point 200 it is judged whether the absolute pressure PM is decreasing. When the pressure PM is increasing the routine goes to point 201, where it is judged whether PM exceeds a predetermined fixed level PM1. If the result of the judgement at the point 201 is "yes", the routine flows to point 202, where it is judged whether a predetermined time Δt has elapsed from the beginning of the decrease in PM. When the predetermined time Δt has elapsed, the routine goes to point 203 where the flag XSCVF is set (See FIG. 16(f)). As will be easily seen, the flag is adapted to detect the leakage of air into the vacuum chamber 34 via the check valve 40 for decreasing the pressure in the vacuum chamber 34 to a level sufficient to open the SCV 17.

When the PM is decreasing, the routine flows from point 200 to point 204. At point 204 it is judged whether the PM exceeds a predetermined level PM2. If the result is "yes", the routine flows to point 205 where the flag XSCVF is reset (0).

Figure 10:
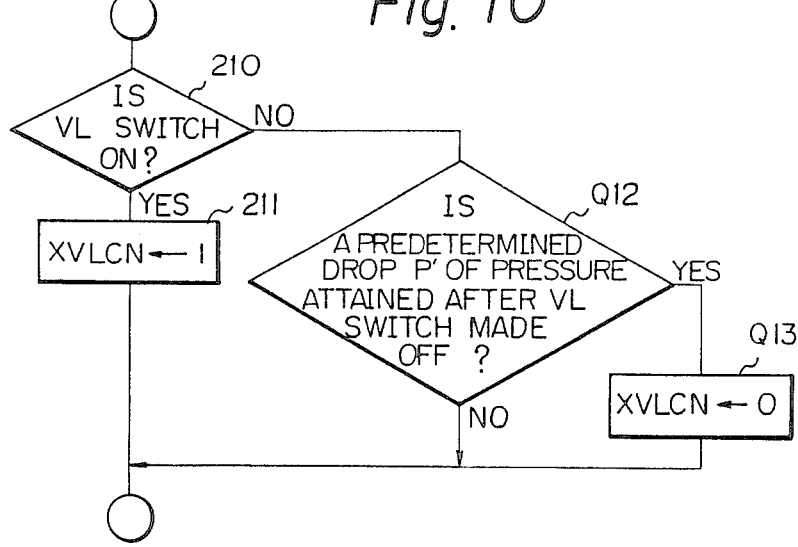
Figure 11:
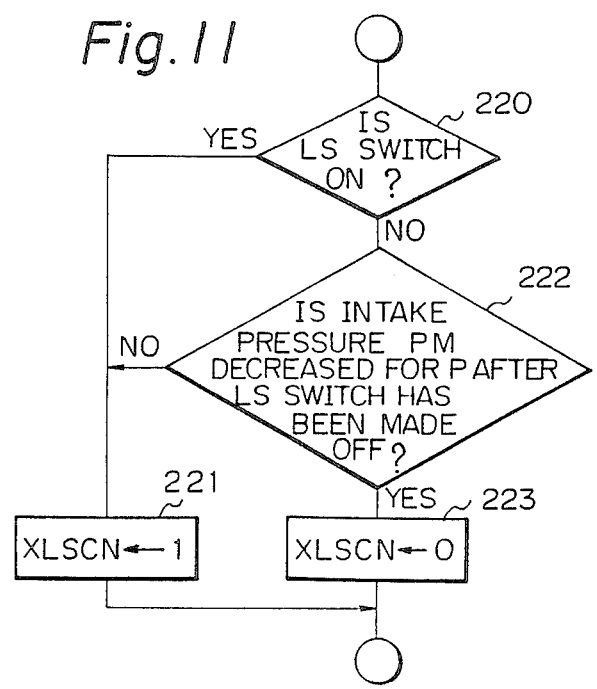
Figure 12:
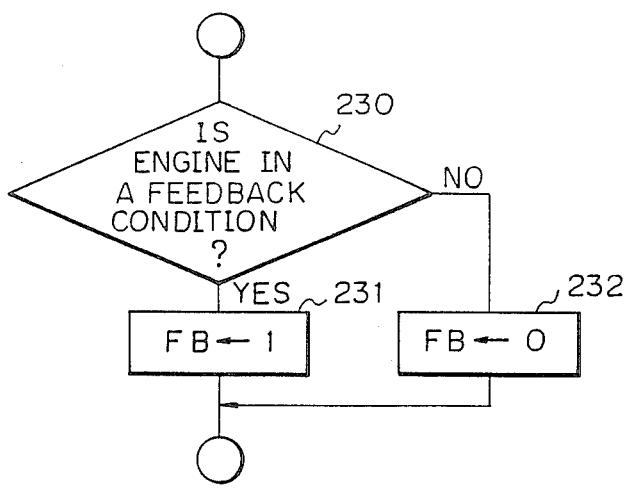

FIGS. 10 to 12 are routines for controlling other flags used in routines for controlling the air-fuel ratio and ignition timing. In FIG. 10, at point 210, it is judged whether the throttle fully open switch VL is ON. When the degree of opening of the throttle valve 27 is larger than 50 degrees, the throttle fully open switch VL is made ON (FIG. 6). In this case, the flag XVLCN is set to 1 at point 211. See FIG. 16 (h). A predetermined pressure drop P' is attained after the switch VL is made OFF. When the pressure drop P' is not yet attained, the flag XVLCN is maintained at 1. When the pressure drop P' is attained, the routine goes to point 213, where the flag XVLCN is reset (0).

Figure 16:
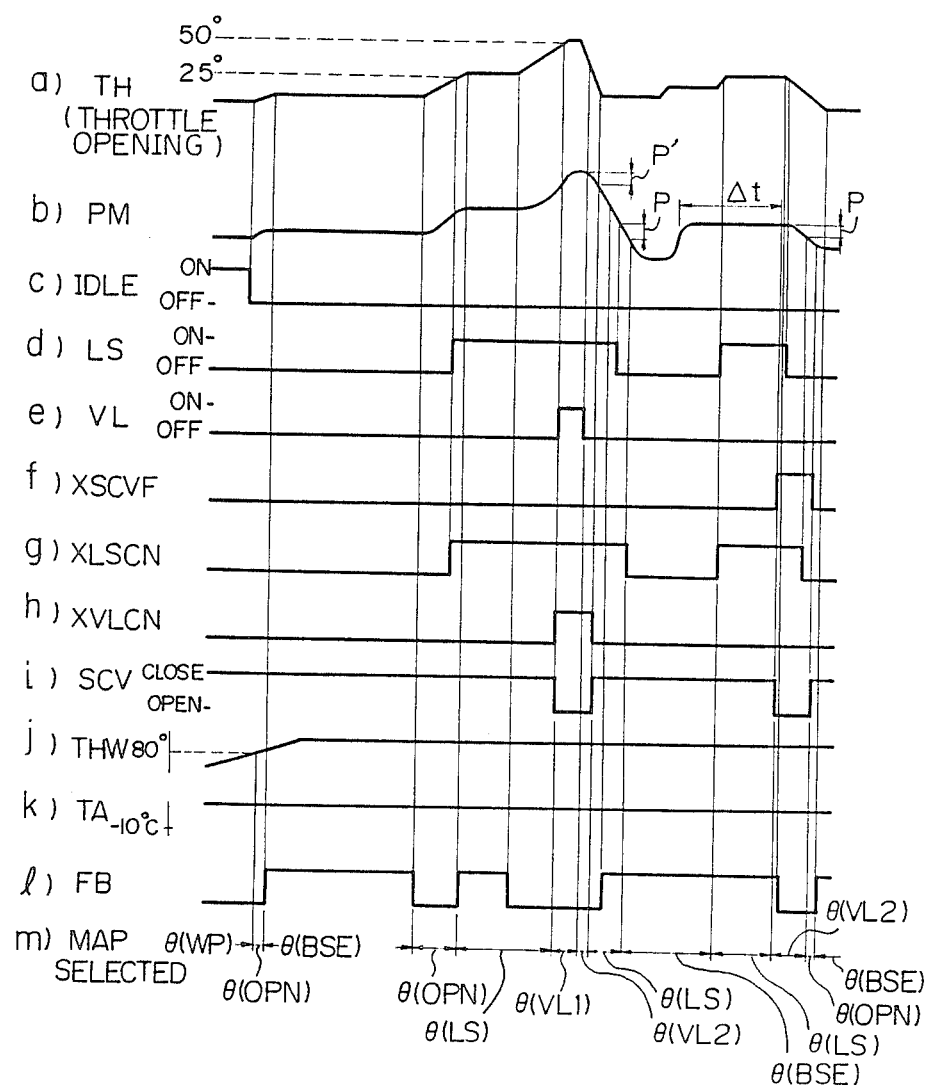
FIG. 16 is a timing chart illustrating the map selection operation according to the present invention.

In FIG. 11, at point 220, it is judged whether the lean switch LS is ON. When the degree of opening TH of the throttle valve 27 is larger than 25 degrees, the lean switch LS is made ON as shown in FIG. 6. The program then proceeds to point 221 to set the flag XLSCN. See FIG. 16 (g). When the degree of opening of the throttle valve becomes smaller than 25 degrees, the switch LS is made OFF, and the program proceeds to point 222 where it is judged whether the absolute pressure PM is decreased for P as shown in FIG. 16(b). When the absolute pressure PM is not decreased for P after the lean switch LS is made OFF, the flag XLSCN is maintained at 1 at point 221. When the pressure PM has attained the drop for P, the program then proceeds to point 223 where the flag XLSCN is reset to 0 as shown in FIG. 16(g).

FIG. 12 is a routine for controlling a feedback flag FB. At point 230 it is judged whether the engine is in a condition in which the closed loop feedback control of the air-fuel ratio is carried out. When the engine is under the following conditions, the feedback control is stopped.

(1) when the engine is under acceleration
(2) when the engine is in an idling condition
(3) when the engine is warming up
(4) when the engine is under deceleration
(5) when the engine is starting
(6) when the lean sensor is not activated When any one of the above mentioned conditions is realized, the engine does not require the feedback control and the program then proceeds to point 232 to reset the feedback flag FB to 0. When any one of the above-mentioned conditions is not realized, then the program proceeds to point 231 where the feedback flag FB is set for allowing the feedback control of the air-fuel ratio to proceed.

Figure 13:
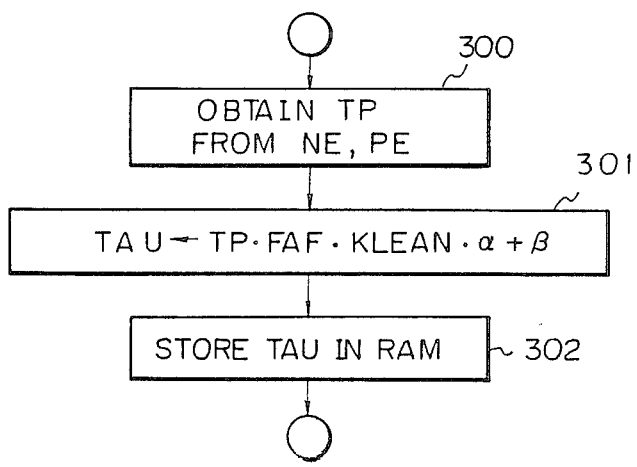

FIG. 13 illustrates a processing routine for calculating the pulse width TAU of the injection signal. This routine is executed in a main routine every time the crankshaft rotates by a predetermined angle, for example, 180 degrees. Referring to FIG. 11, at step 300, the basic pulse width TP of the injection signal is obtained from the engine speed NE and the absolute pressure PM. Data indicating the relationship among the basic pulse width TP, the engine speed NE, and the absolute pressure PM is stored in the ROM 53 in the form of a data table. Thus, at step 300, the basic pulse width TP is obtained from the data stored in the ROM 53. Then, at step 301, the actual pulse width TAU of the injection signal is calculated from the following equation by using the basic pulse width TP, the air-fuel ratio feedback correction coefficient FAF, the lean correction coefficient KLEAN, and other correction coefficients $\alpha$ and $\beta$.

$$TAU = TP \cdot FAF \cdot KLEAN \, \alpha + \alpha$$

FAF is a correction coefficient used for carrying out the closed loop control of the air-fuel ratio. FAF is calculated in the processing routine illustrated in FIG. 15. When open loop control of the air-fuel ratio is carried out, FAF is maintained at 1.0.

KLEAN is a correction coefficient used for changing the desired air-fuel ratio to an air-fuel ratio which is on the lean side of the stoichiometric air-fuel ratio. KLEAN is calculated in the processing routine illustrated in FIG. 14. When the desired air-fuel ratio is the stoichiometric air-fuel ratio, KLEAN is maintained at 1.0.

At step 302, the actual pulse width TAU is stored in the RAM 52. In the main routine processed by sequential interruptions executed every predetermined crank angle, the injection start time and the injection stop time are obtained from the actual pulse width TAU, and the injection signal is output to the I/O port 54 between the injection start time and the injection stop time. As a result, fuel is injected from the fuel injector 24.

Figure 14B:
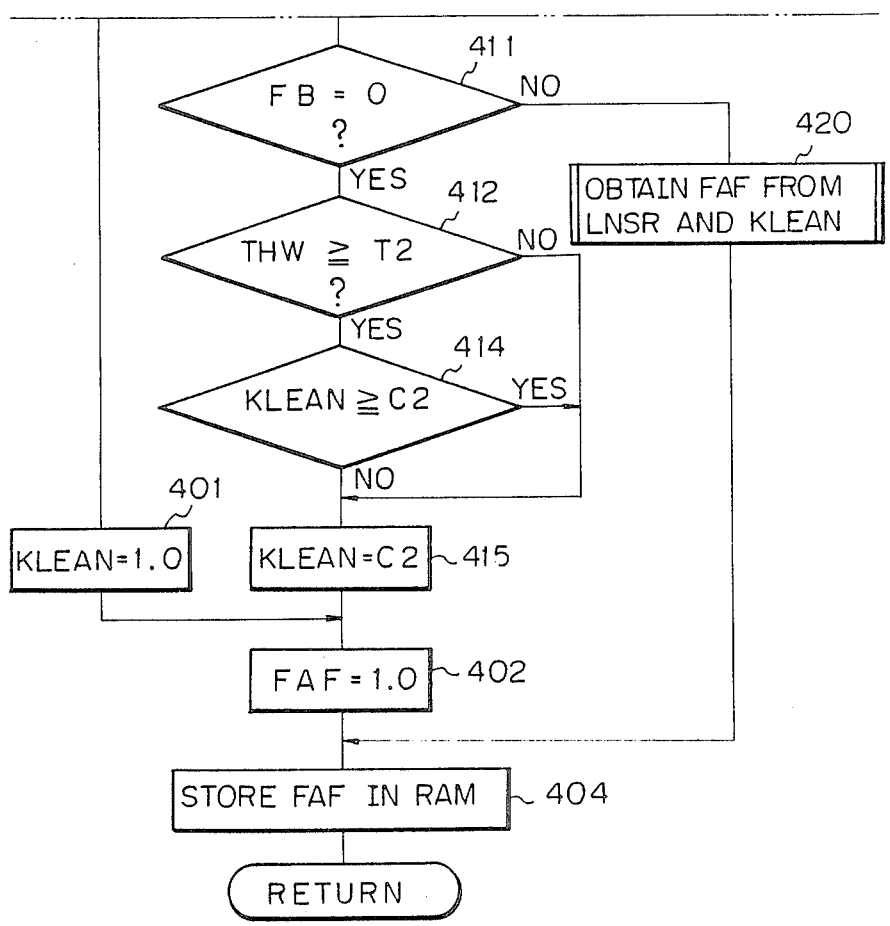

FIG. 14 illustrates a processing routine for calculating the lean correction coefficient KLEAN and the feedback correction coefficient FAF. This routine is executed when the processing routine illustrated in FIG. 14 is carried out in the main routine. Referring to FIG. 14, initially, at point 398, it is determined whether the fully open switch VL of the throttle sensor 28 is made ON. At the following point 399, it is judged whether the flag XSCVF is 1, and at point 400 it is judged whether flag XVLCN is 1. When the VL switch is made ON, the flag XSCVF is 1, or the flag XVLCN is 1, then the routine flows to point 401 where 1.0 is moved to KLEAN. This means that the air-fuel ratio is maintained at the stoichiometric ratio. At point 402, 1.0 is moved to FAF. This means that the closed loop feedback control of the air-fuel ratio is not carried out.

Figure 17:
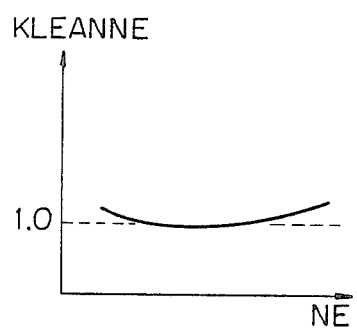
FIG. 17 shows a relationship between NE and KLEANNE.
Figure 18:
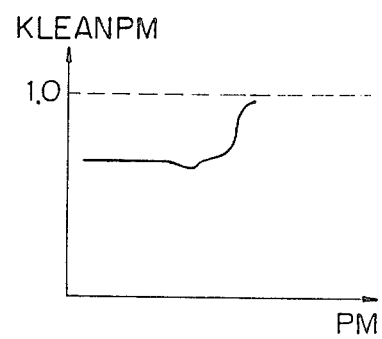
FIG. 18 shows a relationship between PM and KLEANPM.
Figure 20:
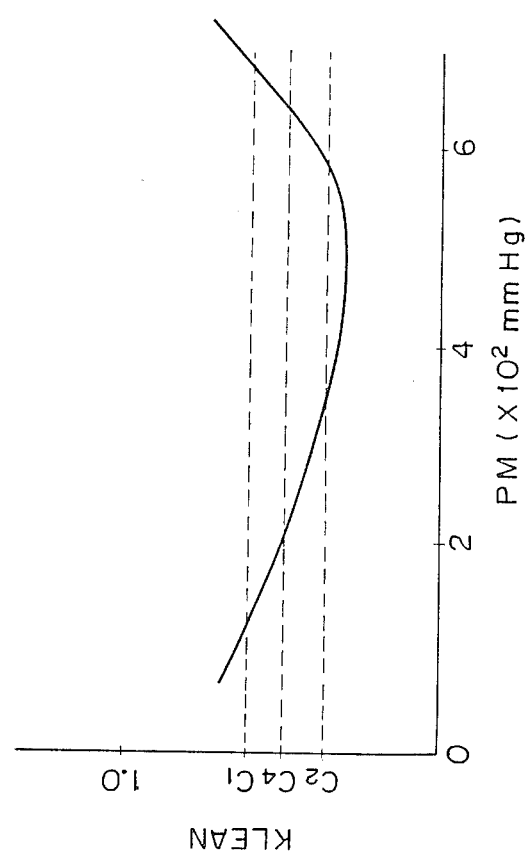
FIG. 20 shows a relationship between PM and KLEAN at a fixed engine speed, with the various minimum values of KLEAN selected in accordance with engine parameters.

When the throttle fully open switch VL is OFF and the flags XSCVF and XVLCN are equal to 0, the swirl control valve 17 is closed or ready to be closed, and the routine flows to point 404 where KLEAN is obtained from the engine speed NE and the absolute pressure PM. That is, data indicating the relationship between KLEANNE and the engine speed NE as illustrated in FIG. 17 is stored in the ROM 53, and data indicating the relationship between KLEANPM and the absolute pressure PM as illustrated in FIG. 18 is stored in the ROM 53. At this step 404, KLEANNE is multiplied by KLEANPM, and thus KLEAN (=KLEANNE·KLEANPM) is obtained. The routine then goes to point 405, where it is judged whether the flag XLSCN is set (1). As mentioned with reference to FIG. 10, the flag XLSCN is set when the lean switch is made ON, and is reset when the absolute pressure PM is decreased for P after the lean switch is made OFF. See FIG. 16 (b) and (g). When the flag XLSCN is 1, the program proceeds to point 406 where it is judged whether KLEAN is larger than a predetermined value C1. When KLEAN is lower than C1, the program flows to point 407 where C1 is moved to KLEAN. When the engine speed is fixed to a predetermined value, the KLEAN calculated at point 404 is changed as shown in FIG. 20, corresponding to the change in the absolute pressure PM. The routine realized at steps 406 and 407 guards the KLEAN to prevent it from becoming lower than the lowest value C1. As a result, the extremely lean air-fuel mixture obtained at step 404 is corrected toward the rich side.

When the flag XLSCN is 0, i.e., the degree of opening of the throttle valve 27 is smaller than 25 degrees, the program flows to point 408, where it is judged whether the water temperature THW is within a range of between T2 and T1. When the result of the judgement at point 408 is "yes", then the engine is cold. In this case, the program proceeds to point 409 where it is judged whether KLEAN is higher than C4. When KLEAN is lower than C4, the program flows to point 410 where C4 is moved to KLEAN. The routines at 408 to 410, guard the KLEAN to prevent it from becoming lower than C4 as shown in FIG. 20. It should be noted that C4 is smaller than C1 at steps 406 and 407. As will be clear from the above, the extremely lean air fuel mixture is corrected also when the engine is cold, although the degree of correction toward the rich side is weakened when compared with the correction realized at point 407 when the flag XLSCN is set.

At point 411, it is judged whether the feedback flag FB is reset (0). As already described with reference to FIG. 12, the feedback flag FB is 0 when the closed loop feedback control of the air-fuel ratio is not carried out. In this case, the routine flows to point 412 where it is determined whether the cooling water temperature THW is larger than $T_2$, for example, equal to 80° C. If the result at point 412 is "yes", the engine has warmed-up. In this case, the routine flows to point 414 where it is judged whether KLEAN is larger than C2. When KLEAN is smaller than C2, the program proceeds to point 415 where KLEAN is fixed at C2. The routines at 411 to 415 ensure that the lowest value of KLEAN does not become lower than C2, when the engine is under open loop control of the air-fuel ratio when the engine is hot. It should be noted that, as shown in FIG. 20, C2 is smaller than C4. This means that the degree of correction toward the rich side is further weakened compared with the correction obtained at point 409 when the engine is cold.

Figure 15:
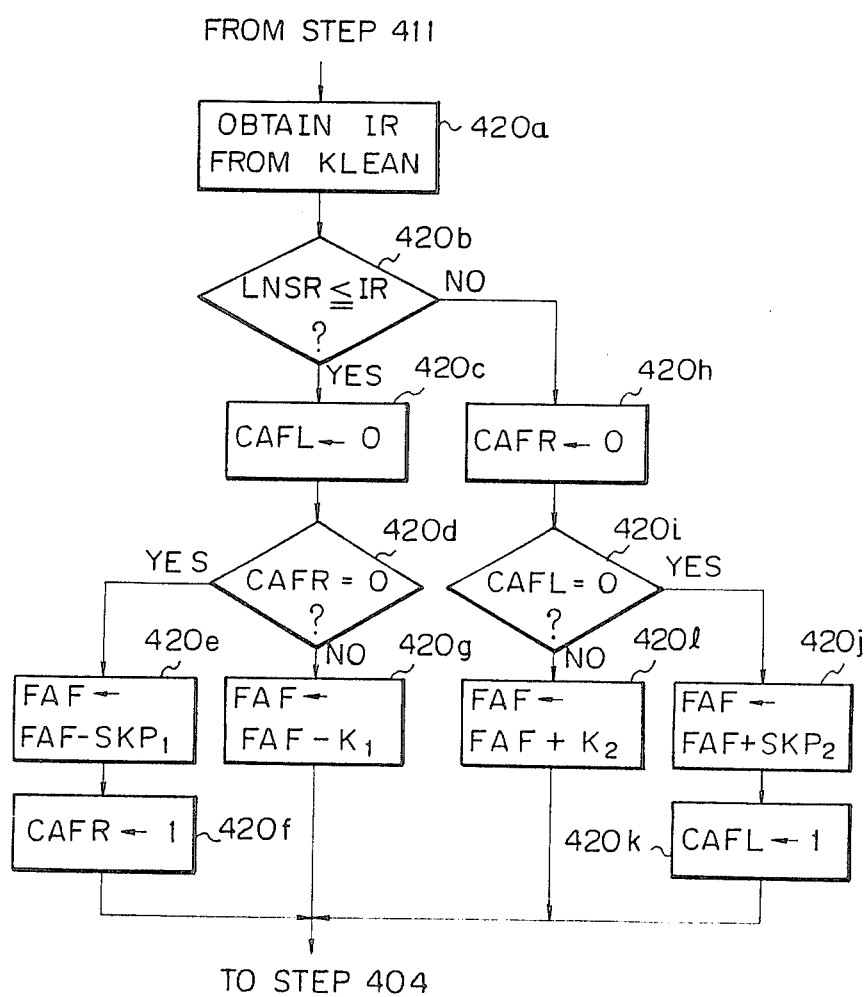

When the feedback flag FB is set, the program flows from point 411 to point 420 where the feedback correction coefficient FAF is obtained from LNSR and KLEAN. FIG. 15 illustrates an example of the processing executed in step 420 of FIG. 14.

Figure 19:
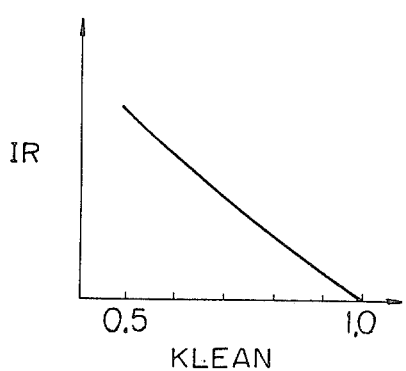
FIG. 19 shows a relationship between KLEAN and a signal from the lean sensor, IR.

Referring to FIG. 15, initially, at step 420, a reference value IR is obtained from KLEAN. Data indicating the relationship between IR and KLEAN as illustrated in FIG. 19 is stored in the ROM 53. IR indicates the output value of the lean sensor 43, which corresponds to the desired lean air-fuel ratio represented by KLEAN. consequently, by comparing the reference value IR with the actual output value of the lean sensor 43, it is possible to control the actual air-fuel ratio so that it becomes equal to the desired lean air-fuel ratio.

At step 420b, the output value of the lean sensor 43 is compared with the reference value IR representing the desired lean air-fuel ratio, that is, it is determined whether the actual air-fuel ratio is on the lean side or on the rich side of the desired lean air-fuel ratio. If LNSR≦IR, that is, if the actual air-fuel ratio is on the rich side of the desired lean air-fuel mixture, the routine goes to step 420. In step 420, the flag CAFL for the skip, which is used at step 420i, is reset. Then, at step 420d, it is determined whether the flag CAFL for the skip is reset. When the actual air-fuel ratio is changed to the rich side from the lean side of the desired lean air-fuel ratio, since the flag CAFR has been reset, the routine goes to step 420e. At step 420e, FAF is reduced by $SKP_1$. Then, at step 420f, the flag CAFR is set. Consequently, when the routine goes to step 420d, it is determined that the flag CAFR is set and the routine goes to step 420g. At step 420g, FAF is reduced by $K_1$. $SKP_1$ and $K_1$ have a fixed value, and the value $SKP_1$ is considerably larger than that of $K_1$. That is, $SKP_1$ is used for instantaneously reducing FAF by a large value, i.e., for carrying out the skip operation of FAF when the actual air-fuel ratio is changed from the lean side to the rich side of the desired lean air-fuel ratio. Contrary to this, $K_1$ is used for gradually reducing FAF, that is, for carrying out the integrating operation of FAF after the skip operation of FAF is completed.

If LNSR>IR, that is, when the actual air-fuel ratio is changed from the rich side to the lean side to the desired lean air-fuel ratio, the processing indicated by steps 420h through 420l is executed. The processing executed in steps 420h through 420l is almost the same as the processing executed in steps 420c through 420g, except that FAF is increased by $SKP_2$ and $K_2$. Consequently, the description regarding steps 420h through 420l is omitted.

Turning to FIG. 14, after FAF is obtained in step 420, the routine goes to step 404, and FAF is stored in the RAM 52.

As will be seen from the above description, the system operates to control the air-fuel ratio in such a manner that it attains various values in accordance with engine conditions. Thus, according to the invention, a system is provided for controlling the ignition timing in such a manner that it attains various values corresponding to an air-fuel ratio varied as described above.

According to the present invention a plurality of maps are provided in accordance with a particular engine operating condition, and one of these maps is selected for calculating an ignition timing suitable for that engine condition. Each map comprises ignition timing data determined by a plurality of combinations of engine speed NE and absolute pressure PM, as shown in the following Table.

| NE | PM | θ |
| --- | --- | --- |
| $D_1$ | $E_1$ | $F_1$ |
| $D_2$ | $E_2$ | $F_2$ |
| $D_3$ | $E_3$ | $F_3$ |
| . | . | . |
| . | . | . |
| . | . | . |
| $D_n$ | $E_n$ | $F_n$ |

In the above table, $D_n$ and $E_n$ are engine speed NE and absolute pressure PM data, while $F_n$ is ignition timing data obtained by a combination of corresponding data for the engine speed NE and absolute pressure PM.

According to the embodiment hereinbelow described, the following maps are provided.

θ(BASE): a map suitable for providing a high fuel consumption efficiency and low emission of toxic component when the engine is operated under the extremely lean air-fuel mixture after the engine has been warmed-up. In this case, when the cooling water temperature is higher than a predetermined temperature, for example, 80° C., the closed loop feedback control of the air-fuel ratio is executed to maintain the very lean air-fuel mixture, the lean switch LS is made OFF since the throttle valve opening degree is lower than the predetermined degree midway between fully open and fully closed, such as 25 degrees, the intake air temperature TA is larger than a predetermined temperature, and the swirl control valve 17 is closed.

θ(OPN): a map suitable for providing a good characteristic when open loop control of the air-fuel ratio is executed after the engine is warmed-up.

θ(LS): a map suitable for providing the required characteristic when the flag XLSCN is set or the outside temperature TAW is low.

θ(WP): a map suitable for providing the required characteristic when the engine is warming-up.

θ(VL2): a map suitable for producing a good characteristic when the swirl control valve 17 is opened.

θ(VL1): a map suitable for providing a good characteristic when the fully open switch VL is made ON, i.e., the air-fuel mixture is controlled to the stoichiometric air-fuel ratio or an air-fuel ratio lower than the stoichiometric air-fuel ratio.

These maps are stored in the areas of the ROM 53 as shown in FIG. 21. The map θ(BASE) is stored between addresses A1 to A2; θ(OPN) between addresses A3 to A4, θ(LS) between addresses A5 to A6; θ(WP) between addresses A7 to A8; θ(VL2) between addresses A9 to A10; and θ(VL1) between addresses A11 to A12.

Figure 22:
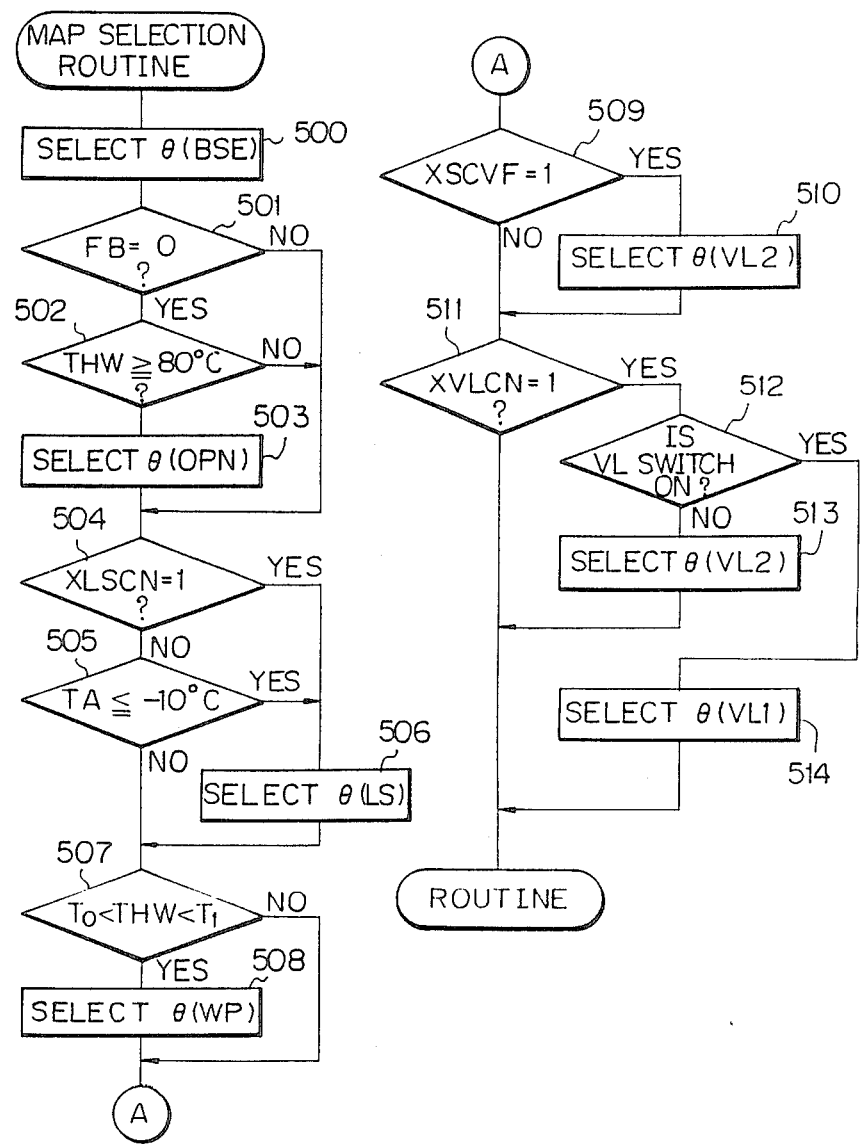
FIGS. 22 to 24 are flow charts for explaining the ignition timing control routine.

FIG. 22 shows a routine for selecting a desired map. This routine is executed when desired in the main routine. At point 500, a map θ(BASE) is selected. This selection routine can be carried out by loading data of the head address of the map θ(BASE), that is, A1 in FIG. 21, to an address of the RAM 52 for storing the head address of the map to be read out. Selection of a map other than θ(BASE) can be similarly carried out.

At point 501, it is judged whether the feedback flag FB is reset. When the closed loop feedback control of the air-fuel ratio is executed, the routine flows to point 503. When the open loop control of the air-fuel ratio is executed, the program flows to point 502 where it is judged whether the engine cooling water temperature THW is higher than the predetermined degree, such as 80° C. When the engine is hot, i.e., warmed-up, the routine flows to point 503 where the map θ(OPN) is selected, the program then proceeds to point 504. As will be easily seen, the map θ(BASE) selected at point 500 is changed to θ(OPN) when the open loop air-fuel ratio control is carried out, while the engine is warmed-up.

At point 504, it is judged whether the flag XLSCN is set. When the flag XLSCN is set (1), the routine flows to point 506. When the flag XLSCN is reset (0), the routine flows to point 505, where it is judged whether the outside air temperature TA is lower than a predetermined value, such as −10° C. When the outside temperature TA is higher than the predetermined value, the program flows to point 507. When the outside air temperature is lower than the predetermined value, the program flows to point 506 where the map θ(LS) is selected, and then flows to point 507. As will be easily seen, the map θ(LS) is used in place of the map θ(BSE) selected at point 500 or the map θ(OPN) selected at point 503, when the flag XLSCN is 1 (the lean switch is ON), or until a predetermined drop of absolute pressure P is attained after the lean switch has been made OFF as shown in FIG. 16 (b)), or when the outside air temperature TA is low and more heat is required from the heating device.

At point 507, it is judged whether the engine cooling water temperature THW is in a range between (for example, 0° C.) to $T_1$ (for example, 80° C.). When the engine is hot (warmed-up), the program proceeds to point 509, and if the engine is cold the program proceeds to point 508, where the map θ(WP) is selected, and then flows to point 509. As will be easily seen, the map θ(BSE), θ(OPN), or θ(LS) selected at the point 500, 503, or 506, is changed to the map θ(WP) when the engine is cold.

At point 509, it is judged whether the flag XSCVF is set. When the flag XSCVF is 0, the routine goes to point 511. When the flag XSCVF is 1, the routine goes to point 510, where the map θ(VL2) is selected, and then goes to point 511. As already mentioned, the flag XSCVF is set, as shown in FIG. 16 (f), when the swirl control valve 17 is opened due to a leakage of air from the check valve 40. As will be easily seen, the map $\theta$(VL2) is used in place of the map $\theta$(BSE), $\theta$(OPN), $\theta$(LS), or $\theta$(WP), selected at point 500, 503, 506, or 508.

At point 510, it is judged whether the flag XVLCN is set. As already mentioned, the flag XVLCN is set when the throttle fully open switch VL is made ON and reset when the swirl control valve 17 is to be closed due to a decrease in the pressure difference between the outside air and the intake pressure, as shown in FIG. 16(h). When the flag XVLCN is set, the routine goes to point 512 where it is judged whether the throttle fully open switch VL is made ON. When the throttle fully open switch is made OFF, the routine goes to point 513 where the map $\theta$(VL2) is selected as in step 510. When the flag XSCVF is reset (0) the vacuum is high enough to allow the swirl control valve 17 to be closed. However, when the flag XVLCN is set, the swirl control valve 17 is opened as shown in FIG. 8. Therefore, the map $\theta$(VL2) is selected as in point 510 when the flag XSCVF is 1.

When the fully open switch XVL is made ON, the routine flows to point 514. As will be clear from the above, map $\theta$(VL1) is selected in place of map $\theta$(BSE), $\theta$(OPN), $\theta$(LS), $\theta$(WP), $\theta$(VL2) or $\theta$(VL1) selected at step 500, 503, 506, 508, 510 (513), or 514.

As explained above, according to the embodiment a plurality of maps $\theta$(BSE), $\theta$(OPN), $\theta$(LS), $\theta$(WP), $\theta$(VL2), and $\theta$(VL1) are provided. The map $\theta$(BSE) is initially selected. A plurality of engine parameters, that is FB, THW, TA, XLSCN, XSCVF, and XVLCN are taken sequentially so that the initially set map is changed to a new map which is located next to the initially set map when the engine condition corresponding to respective parameters exists. The procedure is repeated and the finally selected map is used for controlling the actual ignition timing, as will be fully described later. This means that the selected later map has a higher priority. Therefore, the priority between the maps can be described by the order of the following equation.

$$\theta(VL1) > \theta(VL2) > \theta(WP) > \theta(LS) > \theta(OPN) > \theta(BSE)$$

The order of the maps generally corresponds to the order of the air-fuel ratio values with which the corresponding maps are used. A map located as higher in the order in the above equation is used in an air-fuel ratio of a lower value. The order of the map also corresponds to the ignition timing. A map located as higher in the order has an ignition timing value that is further delayed. This means that a map combined with the low air-fuel ratio has a high priority. In other words, a map having a large ignition timing delay has a high priority.

The priority between the maps is determined by the following concept.

When the map $\theta$(VL1) is to be selected, the throttle valve 27 is fully opened and the air-fuel ratio is on the side which can be richer than the stoichiometric air-fuel mixture. In this case, the engine requires the utmost delayed ignition timing to attain a high output power without generating knocking. Thus, the map $\theta$(VL1) having the highest priority is selected.

When the map $\theta$(VL2) is to be selected, the swirl control valve 17 is opened and the air-fuel ratio is controlled to the stoichiometric air-fuel ratio, which is located on the rich side of the air-fuel ratio when the map $\theta$(WP), $\theta$(LS), $\theta$(OPN), or $\theta$(BSE) is used. The map $\theta$(VL2) has the optimum ignition timing which is more advanced than the ignition timing when the map $\theta$(VL1) is used, and which is delayed more than the ignition timing obtained when any one of the other maps is used, to prevent the generation of knocking. Therefore, the map $\theta$(VL2) has the second order of priority.

Figure 25:
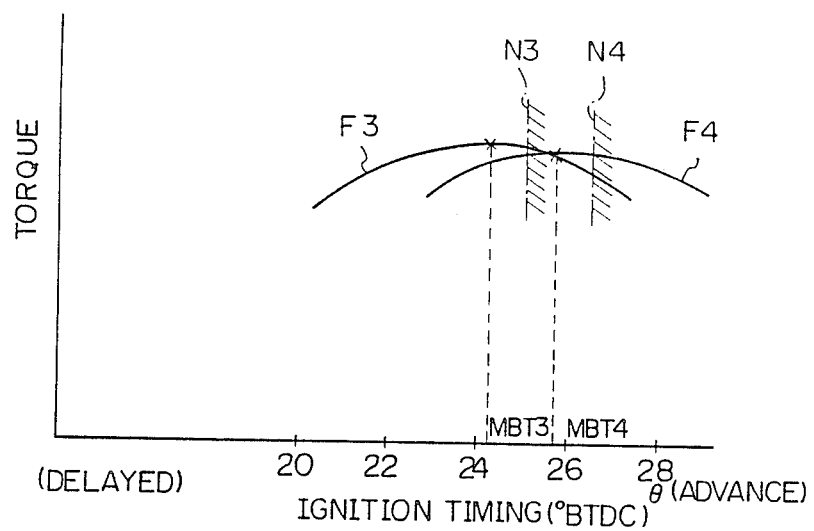
FIG. 25 shows relationships between ignition timing and engine output torque before and after the engine has warmed-up.

When the engine is warming-up, the map $\theta$(WP) is selected. The map has an ignition timing delayed more than the ignition timing obtained when the map $\theta$(LS), $\theta$(OPN), or $\theta$(BSE) is selected, to obtain a stable combustion when the engine is warming-up. Therefore, to prevent any decrease in the drivability, the map $\theta$(WP) having the third order of priority is selected. In FIG. 25, a curve F3 indicates a relationship between the ignition timing and the torque of the engine when the engine is warming-up, while a curve F4 indicates a same relationship after the warming-up is completed. N3 indicates an advance limit determined not to produce knocking when the engine is warming-up. N4 indicates an advance limit determined not to produce any knocking. MBT3 and MBT4 are the optimum ignition timing to produce the highest torque without generating knocking. It should be noted that the value $T_0$ at step 507 of FIG. 22 is lower than the value $T_2$ at step 408 in FIG. 14. This means that the air-fuel ratio is changed when the map $\theta$(WP) is selected during engine warming-up. Therefore, the ignition timing can be suitably controlled during warming-up in accordance with the engine requirements.

When the map $\theta$(LS) is to be selected, an air-fuel mixture is obtained which is richer than the air-fuel mixture obtained when the map $\theta$(OPN) or $\theta$(BSE) is used. In other words, the map $\theta$(LS) has an ignition timing which is delayed more than the ignition timing obtained when the map $\theta$(OPN) or $\theta$(BSE) is selected. Therefore, to prevent knocking, the map $\theta$(LS) has a priority higher than that of the map $\theta$(OPN) or $\theta$(BSE).

Figure 26:
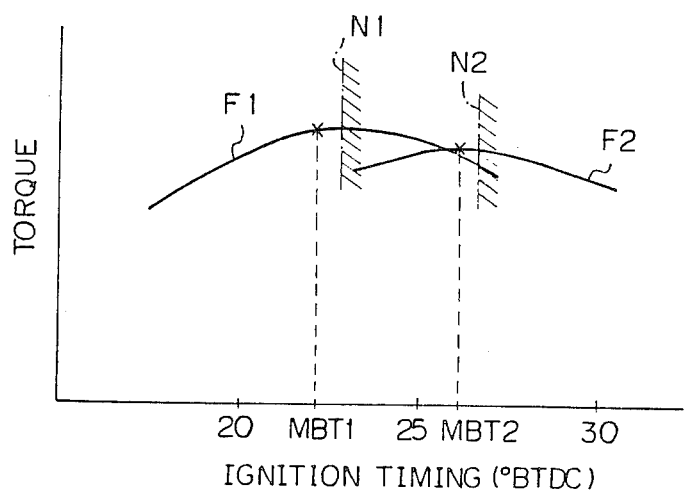
FIG. 26 shows similar relationships when closed loop control is carried out and open loop control is carried out.

When the map $\theta$(OPN) is to be selected, an air-fuel ratio is obtained which is richer than the air-fuel mixture obtained when the map $\theta$(BSE) is used. Therefore, the map $\theta$(OPN) has an ignition timing which is delayed more than the ignition timing obtained when the map $\theta$(BSE) is used. Therefore, the map $\theta$(OPN) has a priority higher than that of the map $\theta$(BSE). In FIG. 26, relationships similar to FIG. 25 are shown. In the Figure, curve F1 indicates a relationship between the ignition timing and the torque when the open-loop feedback control is effected, and curve F2 indicates a relationship between the ignition timing and the torque when the closed loop feedback control of the air-fuel ratio is carried out. N1 indicates a timing limit toward the advanced side during the closed loop control, while N2 indicates a timing limit toward the advanced side during the open loop control. MBT1 and MBT2 indicate the optimum ignition timing for the respective conditions.

The order of priority between the maps is mainly determined in accordance with the air-fuel ratio. As the air-fuel mixture becomes richer the priority of the map to be combined becomes higher.

FIG. 16(m) illustrates how the map selection is attained as a result of the execution of the routine shown in FIG. 22 in accordance with the engine parameters shown in FIG. 16(a) to (l).

Figure 23:
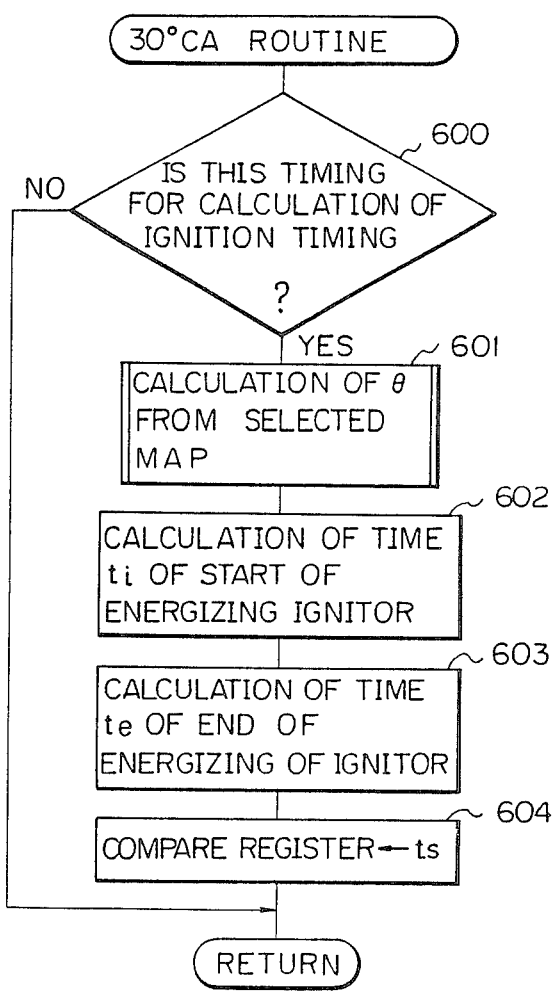

FIG. 23 shows a routine which begins calculations at every 300 signal from the crank angle sensor 48, as shown in FIG. 27(a). At point 600, it is judged whether this timing is for calculating of the ignition timing. As is well known to those skilled in this art, the calculation of the ignition timing is effected at a crank angle area before top dead center (TDC) of the piston 3 in the compression stroke. The control unit 50 is provided with a program (not shown) which issues a signal as shown in FIG. 27(b) indicating that the timing for calculating the ignition timing has been reached, by using a 720° CA signal from the crank angle sensor 49. The issuance of the ignition timing calculation signal causes the program to flow to point 601 where the ignition timing is calculated from the map selected by the routine of FIG. 22.

As already mentioned, the map contains ignition timing values, each value being determined by a combination of engine conditions, such as the engine rotational speed NE and intake pressure PM. The CPU 51 calculates an ignition timing value from the map by combining the engine speed NE and pressure PM values actually sensed by the crank angle sensor 48 and the pressure sensor 29. At points 602 and 603, the times of start ti and end te of the energization of the ignitor 47 are respectively calculated. As shown in FIG. 27(d), since the period T of energization of the ignitor 47 for generating a spark in the spark electrodes is fixed, times ti and te can be calculated from the present time by using the engine rotational speed NE; so that ignition signal becomes high at the time ti and, after the predetermined period T has lapsed, becomes low at time te, which is spaced at the angle θ from TDC, so that the spark is generated in the spark electrodes to ignite the combustible mixture. At a following point 604, the time ti is set to a comparator register provided in the CPU 51.

Figure 24:
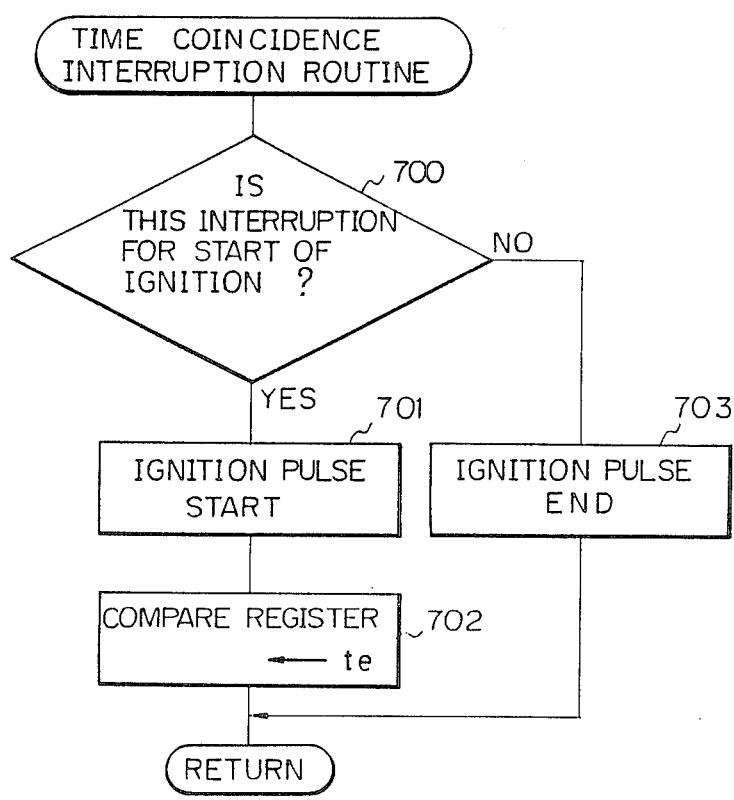

When the present time coincides with the set time ti, the comparator register issues a signal a shown in FIG. 27(c). This signal is supplied to an interruption requirement port in the CPU 51, so that the time coincidence interruption routine as shown in FIG. 24 is commenced. Since this interruption routine is for start of the energization of the ignitor 47, the program proceeds from point 700 to point 701, where the output port issues a signal to energize the ignitor as shown in FIG. 27(d).

When the present time corresponds to the calculated time te, the comparator register issues a signal as shown in FIG. 27(c) to be supplied to the CPU 51 to start the time interruption routine as shown in FIG. 24. The program now proceeds via point 700 to point 703 where the ignition pulse signal supplied to the ignitor 47 becomes low level as shown in FIG. 27(d). A a result, a spark is generated in the spark electrodes of the spark plug 6 to start the ignition of the combustible mixture at the calculated angle θ from TDC.

Figure 28B:
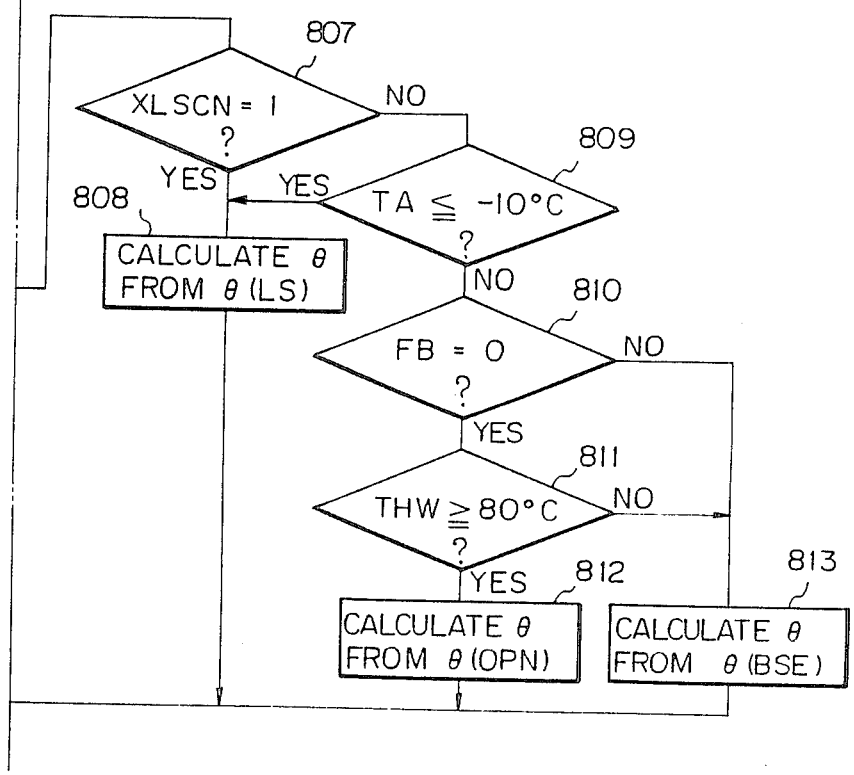

FIG. 28 shows a flow chart in another embodiment of the present invention. This routine is located in the crank angle interruption at every 180 degrees of crank angle before TDC of the piston and can be inserted into the flow chart in FIG. 23 in place of step 601. At point 800, the map θ(VL1) having the highest order of priority is initially selected, and the ignition timing θ is calculated from this selected map by using PM and NE as at step 601 in FIG. 23. At point 801, it is judged whether the VL switch is made ON. If the VL switch is made ON, the routine bypasses the following steps 802 to 813.

The operating parameters XVLCN, XSCVF, THW, XLSCN, TAW, FB and THW are sequentially judged in a similar way. When the engine condition meets the requirement of the one of the parameters, the corresponding map is selected, the ignition timing is calculated, and the calculated ignition timing is used in place of the previously calculated ignition timing. This procedure is repeated, and finally the map θ(BSE) is selected and the ignition timing is calculated therefrom.

As will be clear from the above, this embodiment differs from the first embodiment (FIG. 22) in that the map of the highest priority is selected first, and in that the calculation of the ignition timing is effected simultaneously with the selection of the map. The calculated ignition timing is changed to another ignition timing value when the succeeding parameter meets the requirements of the engine.

In the illustrated embodiments (FIGS. 22 and 28), the parameters of the engine related to the order of priority of the maps are detected in a sequential order, and a map selected in the preceding step is changed to a new map when the corresponding parameter meets the requirements of the engine. However, the present invention can also be realized without judging the parameters in sequential order as shown in the above embodiments.

Although specific embodiments are described, many modifications and changes can be made by those skilled in this art without departing from the scope of the present invention.

What is claimed is:

1. A spark ignition internal combustion engine comprising:
   an engine body;
   an intake system connected to the engine body;
   an exhaust system connected to the engine body;
   the engine body having an intake port capable of providing a swirl motion of intake air;
   a control valve arranged in said intake port for controlling the swirl motion;
   means responsive to operating conditions of the engine for operating the control valve so that it is selectively open or closed in accordance with the operating conditions of the engine;
   fuel injection means for injecting the fuel into the engine;
   means for calculating the air-fuel ratio of air-fuel mixture to be supplied to the engine, the air-fuel ratio being high when the control valve is closed, and being low when the control valve is open;
   means for correcting the calculated air-fuel ratio in accordance with engine conditions;
   means for operating the fuel injector means so that the calculated air-fuel ratio is obtained;
   means for storing a plurality of ignition timing data maps, said maps having a respective order of priority, which order is substantially determined in accordance with the air-fuel ratio in such a manner that the priority becomes higher as the air-fuel ratio becomes smaller;
   means for detecting a plurality of engine parmeters related at least to the air-fuel ratio;
   means for judging whether the parameters detected by the detecting means meet with the engine requirements;
   means for selecting a map which has the highest order of priority from among the maps judged by said judging means so that the detected parameters meet the engine requirements;
   means for calculating an ignition timing from the map selected by the selecting means; and
   means for controlling the ignition so that ignition occurs at the calculated timing.

* * * * *